United States Patent
Mangalam et al.

(10) Patent No.: US 8,155,794 B2
(45) Date of Patent: Apr. 10, 2012

(54) SYSTEM AND METHOD FOR CONTROL OF AEROELASTICITY EFFECTS

(75) Inventors: Arun S. Mangalam, Williamsburg, VA (US); Siva M. Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 1241 days.

(21) Appl. No.: 12/117,010

(22) Filed: May 8, 2008

(65) Prior Publication Data

US 2009/0018703 A1   Jan. 15, 2009

Related U.S. Application Data

(60) Provisional application No. 60/928,290, filed on May 9, 2007.

(51) Int. Cl.
  *G06F 19/00*  (2011.01)
(52) U.S. Cl. .................. 700/282; 701/3; 702/45; 73/147
(58) Field of Classification Search ............... 73/170.12, 73/147; 701/3, 4, 10, 14; 702/45; 700/282
See application file for complete search history.

(56) References Cited

U.S. PATENT DOCUMENTS

| | | |
|---|---|---|
| 4,229,725 A | 10/1980 | Reilly |
| 4,563,684 A | 1/1986 | Maris |
| 4,649,387 A | 3/1987 | Maris |
| 4,727,751 A | 3/1988 | Holmes et al. |
| 4,848,153 A | 7/1989 | Stack et al. |
| 4,932,610 A | 6/1990 | Maestrello |
| 4,936,146 A | 6/1990 | Stack et al. |
| 5,074,147 A | 12/1991 | Sarma |
| 5,209,111 A | 5/1993 | Agarwal et al. |
| 5,218,863 A | 6/1993 | Mangalam |
| 5,299,455 A | 4/1994 | Mangalam |
| 5,600,060 A | 2/1997 | Grant |
| 5,796,612 A | 8/1998 | Palmer |
| 5,890,681 A | 4/1999 | Meng |

(Continued)

OTHER PUBLICATIONS

S. Mangalam, "Real-Time Extraction of Hydrodynamic Flow Charactersitics Uismng Surface Signatures," *Proceedings 13th Intl. Symp. on Unmanned Untethered Submersible Technology*, Aug. 24-27, 2003.

(Continued)

*Primary Examiner* — Albert Decady
*Assistant Examiner* — Douglas Lee
(74) *Attorney, Agent, or Firm* — Hunton & Williams LLP

(57) ABSTRACT

A system is provided for control of a structure immersed in a fluid flow regime. The system comprises a plurality of flow sensors disposed on a surface of the structure, the flow sensors including at least one flow bifurcation point sensor. The system further comprises at least one structural sensor attached to the structure for measurement of a structural parameter. A data processor in communication with the flow sensors and the at least one structural sensor is configured for processing the data signals and for generating and transmitting one or more actuator command signals to effect a desired flow and structural state for the structure. The system also comprises at least one actuator in communication with the data processor. Each of the at least one actuator is configured for effecting, in response to an actuator command signal, one of the set consisting of a structural deformation in at least a portion of the structure, a change in configuration of a control surface of the structure, and an operational change in a flow control device embedded in the structure.

20 Claims, 4 Drawing Sheets

U.S. PATENT DOCUMENTS

| | | | |
|---|---|---|---|
| 6,134,959 A | 10/2000 | Mangalam et al. | |
| 6,169,496 B1 | 1/2001 | Martin et al. | |
| 6,216,063 B1 * | 4/2001 | Lind et al. | 701/3 |
| 6,253,126 B1 | 6/2001 | Palmer | |
| 6,390,417 B1 | 5/2002 | Yoshino | |
| 6,424,923 B1 | 7/2002 | Huyer et al. | |
| 6,826,493 B1 * | 11/2004 | Mangalam | 702/45 |
| 6,963,810 B2 * | 11/2005 | Mangalam | 702/45 |
| 7,302,838 B2 * | 12/2007 | Mangalam | 73/147 |
| 2005/0049803 A1 * | 3/2005 | Mangalam | 702/45 |

OTHER PUBLICATIONS

S. Mangalam, "Phenomena-Based Real-Time Aerodynamic Measurement System (PRAMS)," *2003 IEEE Aerospace Conference Proceedings*, Mar. 8-15, 2003.

* cited by examiner

SYSTEM AND METHOD FOR CONTROL OF AEROELASTICITY EFFECTS

CROSS-REFERENCE TO RELATED APPLICATIONS

This application claims priority to U.S. Provisional Application No. 60/928,290, filed May 9, 2007 which is incorporated herein by reference in its entirety.

FIELD OF THE INVENTION

The invention relates generally to control of a structure immersed in a fluid regime, and more specifically to control of a craft such as an aircraft using flow bifurcation data with other flow data and structural sensor data to determine adjustments to the craft's structural configuration and flow state.

BACKGROUND OF THE INVENTION

The control of highly flexible aircraft has been a major multidisciplinary problem due to the complex fluid structure interaction (FSI) of the aircraft structure and surrounding airstream. FSI in aircraft introduces aeroelastic phenomena such as flutter from the right combination and phasing of structure vibrational modes of an aircraft wing, fuselage, empennage or other structural components. Aerodynamic forces generated by the interaction of the airstream with the flexible aircraft structure can result in an unstable oscillatory aeroelastic deformation of the structure called flutter. Aeroelastic phenomena depend on numerous structural factors (mass, stiffness, shape of the structure, particular operating conditions of the structure, etc.) and flow factors (velocity, density, turbulence, etc.).

Aeroelastic phenomena may involve both bending and torsional types of motion. In the normal operating envelope of the aircraft, the aeroelastic deformations may be relatively mild and stable. However, in certain cases of flutter, an unstable mode may result when the torsional mode extracts energy from the airstream and drives the bending mode to increasingly higher amplitudes potentially leading to catastrophic structural failure.

The avoidance of unstable aeroelastic conditions such as flutter and the determination of the maximum allowable flight parameters before flutter is encountered are critical priorities for designers of aeroelastic structures and aerospace vehicles. Exhaustive flight and wind tunnel tests are usually conducted to record and observe the flutter characteristics of the various aeroelastic structures of an aircraft over the entire operating envelope of the aircraft. Every time the external aircraft structure is modified, e.g. attachment of external stores for military combat aircraft, aircraft operation in the prescribed flight envelope must be validated with regard to flutter.

A major problem with highly flexible aircraft is the necessity for making design compromises in the wings for effectiveness over the flight envelope. Aerodynamic requirements for different flight conditions vary. Compromises may lead to stiffening of wings increasing the aircraft weight. Effective control of aircraft aeroelasticity increases the design space for aircraft substantially increasing the potential for performance and safety improvements.

In recent years, several active control strategies have been employed to control adverse aeroelastic phenomena using a variety of surface flow and structural actuators, flow and structural sensors and control strategies. Surface flow actuators include typical control surface deflections, flow displacement, injection, suction and other local flow actuation mechanisms. Structural actuators include actuators that modify the mass, stiffness, shape, and particular operating conditions of the structure, e.g. piezoelectric actuators to induce strain to strengthen a wing structure.

To effectively utilize the flow and structural actuators in a control scheme, the aerodynamic and structural loads must be obtained in some form. Sensors for monitoring and controlling aircraft aeroelasticity consist of primarily pressure sensors for determining the aerodynamic loads and structural sensors, e.g., strain gages and accelerometers, for the structural loads and moments. It is important to realize that the aircraft structure responds to the aerodynamic forcing function and therefore inherently lags the aerodynamics. As the inertial sensors are attached to the aircraft structure, the inertial sensor response significantly lags the flow sensor. Ideally, one would like to obtain an estimate of the differential or absolute aerodynamic loads without lag. However, sensors usually have lag, due to the inherent transduction mechanism; e.g., pressure sensors obtain the surface normal forces through the structural deflection of a thin diaphragm (if there is any tubing, then there is additional pneumatic lag). In addition to the lag, for accurate monitoring and control of aerodynamic loads, sensor signal levels should preferably be relatively high and relatively noiseless under aircraft environmental conditions (pressure, temperature, density) and operating conditions (electromagnetic and radio-frequency interference, vibration, etc.). Without an accurate, low-lag sensor for the aerodynamic state, aircraft control designers must infer the aerodynamic state from the response of the structure, general aircraft state (speed and angle-of-attack) and a complex aeroelastic model relating the flow and structural states. The uncertainty is as good as the FSI model, and can be especially suspect for time-varying, unsteady aerodynamic flows.

SUMMARY OF THE INVENTION

Embodiments of the invention are provided with multiple objectives in mind including but not limited to: providing a system for controlling an aircraft utilizing a flow bifurcation point sensor in conjunction with other flow and structural sensors to compute the appropriate adjustments to effect a desired wing flow and structural state through the use of flow and structural actuators; providing a system for controlling an aircraft with minimal flow sensor calibration in conjunction with other flow and structural sensors to compute the appropriate adjustments to effect the desired wing flow and structural state through the use of flow and structural actuators; providing a system for controlling an aircraft with flow bifurcation point-based aerodynamic load sensors in conjunction with other flow and structural sensors to compute the appropriate adjustments to effect the desired wing flow and structural state through the use of flow and structural actuators; providing a system for obtaining flow bifurcation points/lines and subsequently sectional/span-wise aerodynamic loads and moments through the use of other non-heat transfer based sensors; providing a system that optimizes lift and drag during cruise and maneuver; providing an aircraft control system that will yield improved control effectiveness; providing an aircraft control system that will result in reduced weight and drag for the aircraft; providing an aircraft control system that will automatically compensate for a damaged control actuator and/or sensor; and providing an aircraft control system which will vary the configuration of the aircraft wings by aeroelastically deflecting same into one which is desirable for the immediate flight conditions.

A particular aspect of the invention provides a system for control of a structure immersed in a fluid flow regime. The system comprises a plurality of flow sensors disposed on a surface of the structure, the plurality of flow sensors including at least one flow bifurcation point sensor. The system further comprises at least one structural sensor attached to the structure for measurement of a structural parameter. A data processor in communication with the flow sensors and the at least one structural sensor is configured for processing the data signals and for generating and transmitting one or more actuator command signals to effect a desired flow and structural state for the structure. The system also comprises at least one actuator in communication with the data processor. Each of the at least one actuator is configured for effecting, in response to receiving an actuator command signal from the data processor, one of the set consisting of a structural deformation in at least a portion of the structure, a change in configuration of a control surface of the structure, and an operational change in a flow control device embedded in the structure.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
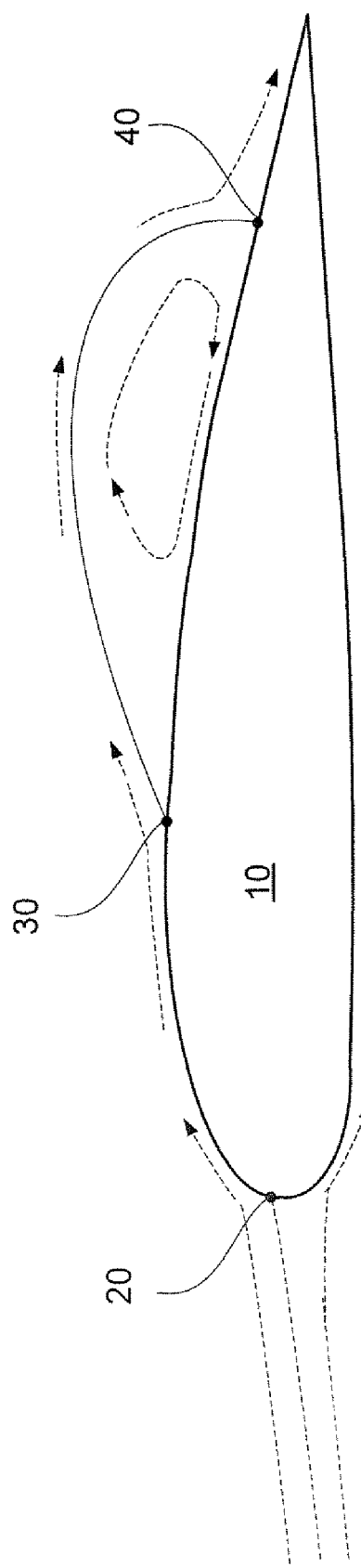
FIG. 1 is a schematic representation of the flow around a wing section.

While the invention will be described in connection with the preferred embodiment, it will be understood that it is not intended to limit the invention to those embodiments. On the contrary, it is intended to cover all alternatives, modifications and equivalents that may be included within the spirit and scope of the invention as described.

Embodiments of the invention provide methods for controlling an aircraft using flow bifurcation point ("FBP") measurements in conjunction with other sensor measurements. These measurements are used by a data processor to estimate the energy transfer from the fluid to the structure in real-time. The data processor can then determine appropriate time-dependent, flow/structural-state dependent signals for transmission to any of various aircraft actuator systems to efficiently bring the aircraft to a desired flow and structural condition.

Aircraft actuators include those that alter the configuration of various control surfaces such as leading-edge slats and extensions, ailerons, etc. They may also include surface flow actuators (e.g., blowers) that modify the flow state, and structural actuators that actively change the structural state of, for example, a wing. See, e.g. U.S. Pat. No. 4,330,100, "Means for controlling aerodynamically induced twist."

Surface flow actuators affect the local circulation altering lift and drag characteristics (e.g., by reattaching separated flow through the use of Zero-Mass Flux (ZMF) and oscillatory suction). Structural actuators alter the structural state to either suppress or accentuate the structural response to the aerodynamic forcing function by changing the mass, stiffness, shape, and/or operating condition of the structure. In this way, a structural actuator can be used to change a structure's configuration to reduce the structural response to a rapid change in load conditions. Control surfaces are generally employed for pitch, yaw and roll control. The effect of changes in control surface configuration is to change the effective camber of the wing section thereby producing a change in lift and drag characteristics for each wing section.

Systems according to embodiments of the invention include FBP sensors (e.g., hot film sensors as described in U.S. Pat. No. 6,826,493 ('493 patent), which is incorporated herein by reference in its entirety) and structural sensors (e.g., accelerometers and strain gages), which provide flow and structural state data to the data processor. The data processor may be in communication with aircraft structural and flow control mechanisms. These actuators may include, but are not limited to, actuators for changing the shape of flexible wings, actuators for manipulating control surfaces that are attached to or are part of the wing fuselage or other aircraft structures (e.g., ailerons, spoilers, flaps, etc.), other structural actuators (e.g., piezoelectric patches), and actuators for surface flow control (e.g., fluid injectors and surface plasma actuators).

The aircraft control mechanisms selectively adjust the control surfaces, surface flow actuators, and structural actuators so that the wings are deformed, the wing structure is regulated and the local flow condition is altered in a desired manner in response to the identified flow and structural states. The system can be used for aircraft control, optimum cruise, and maneuver performance. In addition, aerodynamic and structural loads can be controlled for maneuver, gust load alleviation, flutter suppression, or to actively induce additional aerodynamic loads and moments through the real-time manipulation of the fluid structure interaction.

Although the systems described herein primarily relate to aircraft structures, it will be understood by those of ordinary skill in the art that other non-aircraft aeroelastic structures, e.g. rotating blades and underwater keels, can be similarly controlled and benefited using the methods and systems of the invention. It will also be understood that the methods of the present invention apply to all fluid flow regimes. Thus, although the term "aerodynamic" may be used in describing the phenomena that may be countered using embodiments of the invention, the invention may also be used in hydrodynamic and other fluid flow regimes.

As noted above, the use of FBP measurements in conjunction with other sensor measurements allows the estimation of the energy transfer from the fluid to the structure in real-time. As discussed in the '493 patent and in U.S. Pat. No. 6,134,959 ('959 patent), which is incorporated herein by reference in its entirety, FBPs occur when the flow attaches to or separates from the body. Flow separation and vortex shedding occur primarily due to the inability of the flow to negotiate large pressure gradient. Under certain conditions, the separated vortex flow can also reattach itself to the body. FIG. 1 shows an idealized picture of the bifurcation flow features for an airfoil 10. It can be seen that the leading-edge stagnation point (LESP) 20, flow separation point 30, and flow reattachment point 40 all share a common feature: the local streamlines bifurcate in opposite directions. These bifurcations result in a local minimum in shear stress and, accordingly, convective heat transfer.

Strategically located hot-film sensors can be used to monitor FBP location. As described in the '493 patent, critical boundary layer flow features, including FBPs, are located through surface measurement of shear stress using hot-film sensors and used to determine unsteady aerodynamic loads. A variation of the methods in the '493 patent could include other types of shear stress sensors not necessarily based on heat transfer transduction principles as long as they have the appropriate frequency/phase response and minimal lag. The method of the '493 patent estimates aerodynamic loads using the stagnation point and other critical boundary layer flow features. In this method, to calibrate the stagnation point sensor to obtain aerodynamics loads, lift coefficient may be independently obtained either through a model or through measurement (e.g., integrated pressure profile) with the flow sensor. The aerodynamic loads can be estimated using techniques developed in the '493 patent given the lift coefficient for the measured shape. In cases where wing deformation occurs, the effects of the deformation on FBP location may also be taken into account. This effect may be established either through computational, analytical studies or experimental testing.

It can be seen that FBPs such as stagnation point can be determined by looking at the shear stress distribution. This may be accomplished if a constant overheat anemometer is used in conjunction with hot-film sensors to measure the local shear stress. Other measurement techniques may be used instead or in addition to measure shear stress or a quantity proportional to it. For example, there are the so-called "direct" shear stress sensors measuring the integrated force on a flush-mounted moving sensor element. As an example of a "direct" shear stress sensor, "floating" elements can be used to measure shear forces by measuring the displacement or derivatives thereof through various transduction techniques (e.g., resistive/capacitive/inductive, piezoelectric, optical/magnetic transducers, etc.). Another example of a direct shear stress sensor is the measurement and correlation of the instantaneous structural state (e.g., resonant frequency, mode shape, etc.) of a sensor element to an imposed shear force. Yet another example of "direct" shear stress sensors include surface protrusions (surface fence probe, MEMS cilia/hair probe, etc.), in which the shear forces induce a measurable strain on the protrusions. All of these and other shear stress sensors have varying lag, bandwidth and sensitivity limitations. However, these sensors can be used to locate the FBPs by applying the shear stress techniques (e.g., minimum shear stress, phase reversal/negative cross-correlation, double frequency, etc.) described in the '493 and '959 patents. Unlike heat transfer based sensors, sensors requiring the integrated shear forces for measurement inevitably have an inherent delay. However, taking into consideration (i.e., modeling) any distortions in the shear stress measurement by the "direct" shear stress sensor, previous techniques such as obtaining the stagnation point location by identifying the minimum shear stress near the leading edge may be used in the methods of the present invention.

Although local shear stress may be used to locate an FBP such as the stagnation point, other transduction mechanisms are possible. For example, it is possible to estimate the stagnation point by measuring the heat flux around an aerodynamic body such as a cone. This technique will allow the methods of the invention to be applied in hypersonic applications in which heat transfer distribution can be used to estimate the fluid structure interaction for controlling the aerothermoelasticity of hypersonic vehicles.

A combination of various types of shear stress or non-shear stress based sensors to determine FBP locations may be useful to co-calibrate sensors. For example, "direct" shear stress measurements may be easier to calibrate than "indirect" shear stress sensors like hot film sensors, so it may be advantageous to calibrate hot film sensors with respect to a co-located "direct" shear stress sensor and subsequently use the hot film for high bandwidth measurements in which the "direct" shear stress sensors may not be usable. This technique of advantageously combining sensors may be further extended to include the calibration of FBP-based aerodynamic load sensors with co-located pressure sensors measuring steady-state aerodynamic loads through the pressure profile on the upper and lower wing surfaces. Since the FBP-based aerodynamic load sensors are better suited for measurements requiring high dynamic response than pressure sensors, once they are calibrated under steady-state conditions, the FBP-based aerodynamic load sensors may be preferable to pressure sensors.

Figure 2:
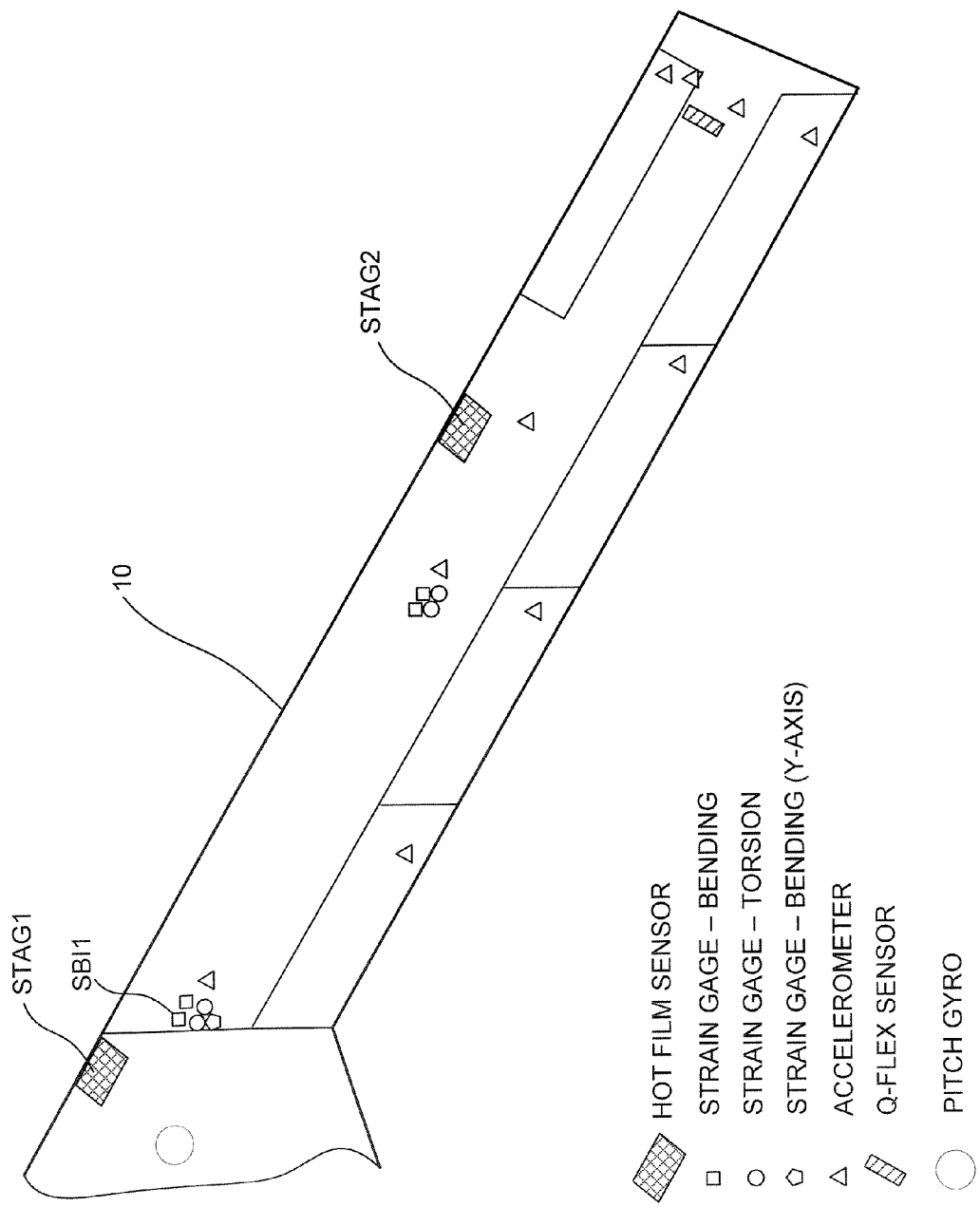
FIG. 2 is a schematic representation of a wing structure having flow and structural load sensors applied thereto.

A significant advantage of the methods of the invention is that with strategic placement, only a few sensors may be required to locate the necessary FBPs to obtain an estimate of the unsteady aerodynamic loads. FIG. 2 illustrates a typically instrumented wing structure for use in implementing the methods of the invention. For this structure and the flow regime of interest, two hot film sensor arrays—STAG1 near the wing root and STAG2 approximately three-fourths of the way outboard toward the wing tip—were sufficient for locating the leading edge stagnation points for estimating the aerodynamic loads across the wing span.

FIG. 2 also shows the placement of a variety of structural sensors. These include strain gages (e.g., SBI1 positioned to measure root bending) and accelerometers for measuring bending, torsion and local accelerations. Additional structural sensors may include sensors that measure displacement for the purpose of determining wing shape along the chord and span. Structural sensors provide the structural response to the aerodynamic forcing function.

In general, wing-mounted structural sensors measure motion of the respective portions of the wings where they are located. The wing sensors may include linear accelerometers that are positioned to measure vertical acceleration. Aircraft also employs fuselage sensors that are positioned on the right and left sides of the fuselage respectively. Sensors, which may also include linear accelerometers, are spaced equidistant from the fuselage center line and measure vertical fuselage acceleration so that loads on the wings can be isolated (from fuselage movement and for asymmetric conditions).

A plurality of other sensors may also be provided on the aircraft to measure roll, pitch, and yaw movement of the aircraft, lateral movement of the fuselage, Mach number, and altitude.

As noted above, the appropriate combination of output from the flow and structural sensors provides an estimate of the energy transfer from the fluid to the structure in real-time. Specifically, the combination of output from the FBP sensor and a structural sensor, e.g. strain gage or accelerometer, provides orthogonal information to the existing data stream. For example, the phase difference between a co-located FBP sensor and accelerometer could provide critical information regarding the coupling of the fluid with the structure as it relates to the aerostructural stiffness and damping terms.

A unique aspect of the methods of the invention is that obtaining phase information from the shear stress sensor and structural sensor does not need calibration. Consequently no calibration is needed to obtain the phase difference. Moreover, with the shear stress signal, it is possible to use a phase reversal technique to effectively set bounds for the FBP location without any a priori calibration. Therefore, it is possible to compute an aeroelastic control signal for the actuators without calibrating the flow or structural sensor, which makes the system more robust relative to sensor-related errors. In addition to this technique, if shear stress sensors are used in conjunction with an array of calibrated surface pressure sensors along the chord, then the shear stress sensors can be auto-calibrated to provide aerodynamic loads in steady state conditions using the sectional lift obtained by integrating the sectional pressure profile. Steady state sectional lift can be estimated using a few pressure sensors.

Figure 3:
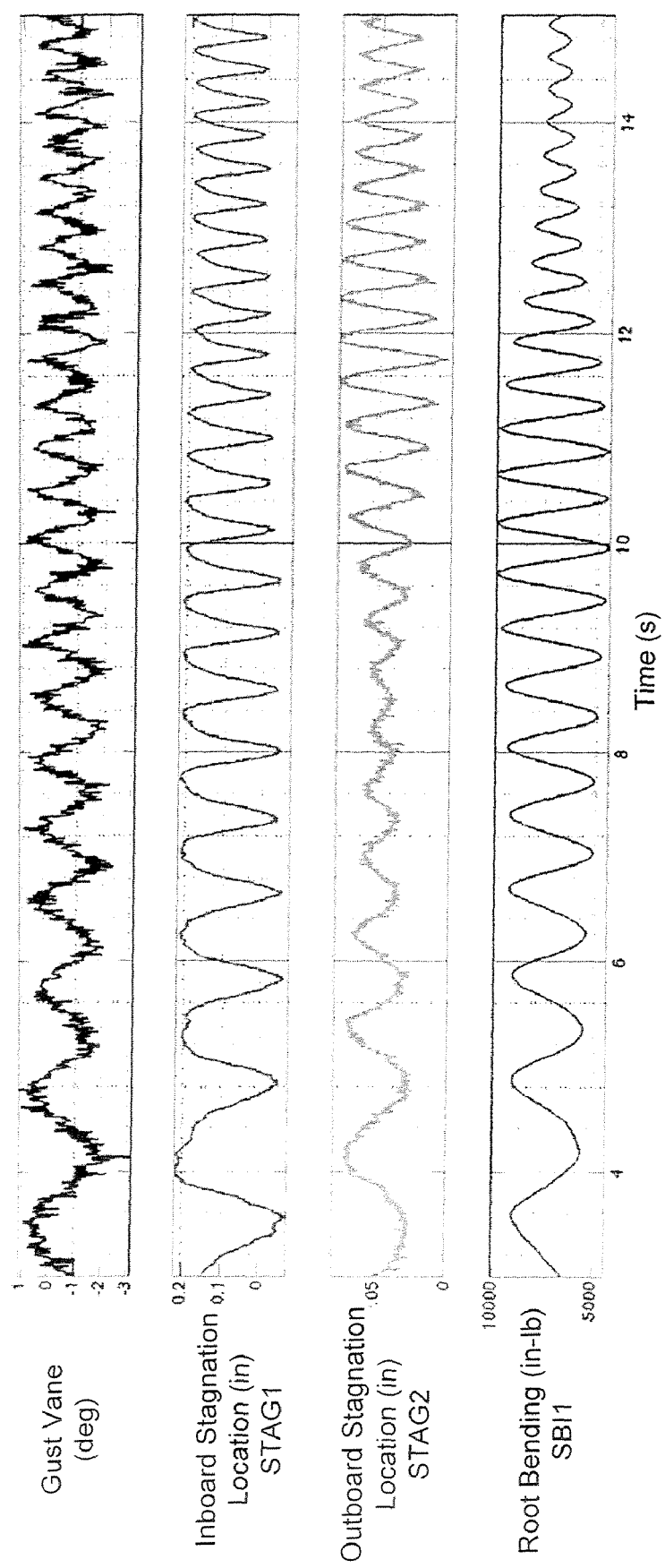
FIG. 3 is a graphical depiction of the open-loop response of an aircraft wing instrumented with flow and structural load sensors.

FIG. 3 depicts the open-loop response of a wing structure to a sinusoidal gust sweep from low to a higher frequency. The gust frequency is illustrated by the gust vane trace. The other three data traces show the stagnation point locations determined from the STAG1 and STAG2 hot film sensors and the root bending determined from SBI1. The phase difference between the hot-film sensor output and the root bending measured with the strain gage changes as the gust causes the wing to get into a resonance condition. As seen in FIG. 3, the FBP locations and the actual aerodynamic loads may not need to be explicitly calculated in order for the system to determine an appropriate response to the flow and structural states. The local shear stress data when correlated with structural sensors at each wing section may provide enough information to compute a control signal for the actuators. In fact, just two shear stress sensors are adequate to characterize the trends of the fluid-structure interaction for data processing system to process. In general, two sensors exposed to the flow are required because the sensors need to have a reference with regard to the realistically changing flight environment with continuously varying pressure, temperature, and air density among many other factors. Additional sensors (i.e., more than two) allow for redundancy in case of sensor failure and for higher precision for estimating the aerodynamic loads. In addition, after extensive computation or analytical modeling of FBPs and experimental testing with FBP sensors, it may be possible under limited flight conditions to infer or more accurately estimate the FBPs or the aerodynamic loads and moments based on the measured instantaneous structural state, thereby reducing the need for any surface flow sensors.

Figure 4:
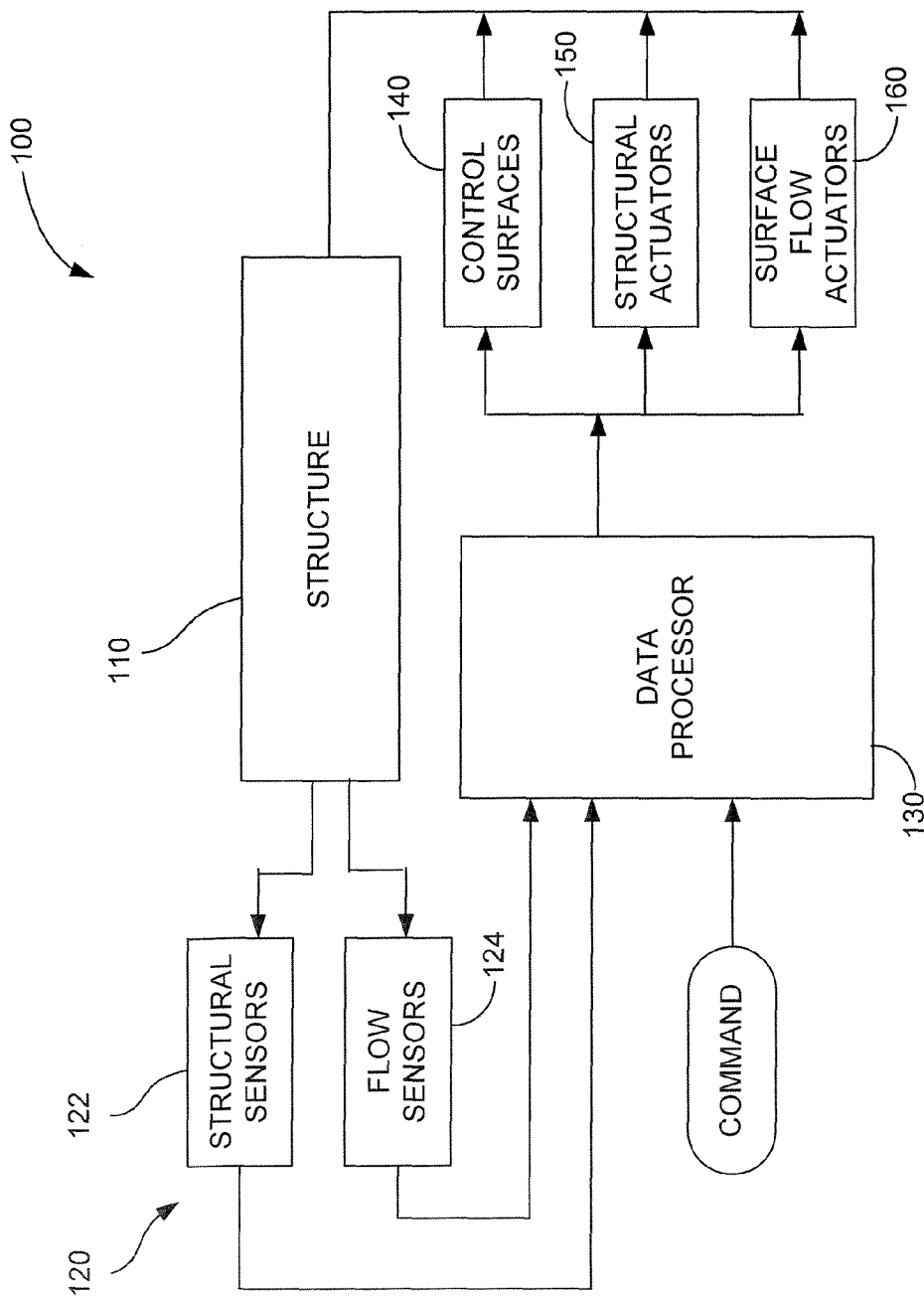
FIG. 4 is a block diagram of a control system according to an embodiment of the invention.

The block diagram in FIG. 4 illustrates a system 100 for controlling response to aeroelastic effects on a structure 110 (e.g. an aircraft wing) immersed in a fluid flow regime. The system 100 includes a sensor array 120, which may include a set of flow sensors 122 and a set of structural sensors 124 applied to or incorporated into the structure 110. The flow sensor set 122 may include one or more FBP sensors such as hot-film sensors or "direct" shear sensors as described above. The flow sensor set 122 may also include pressure sensors. The sensor array 120 may also include a set of structural sensors 124, which may include accelerometers and/or strain gages. The various flow sensors and structural sensors are disposed on and within the structure 110 to as to provide information sufficient to establish the flow and structural state of the structure 110.

The system 100 further includes a data processor 130 in communication with the sensor array 120. The data processor 130 is configured for receiving and processing data from the various sensors of the sensor array 120, for determining one or more actuator command signals, and for transmitting such actuator command signals to one or more aircraft actuators. The data processor 130 may also be configured to receive command inputs from a separate source (e.g., pilot input) for use in determining actuator command signals. The data processor is, accordingly, in communication with such aircraft actuators, which may include control surface actuators 140, structural actuators 150, and surface flow control actuators 160. Actuation of one or more of these actuators 140, 150, 160 results in a change to either or both of the flow state and the structural state of the structure 110.

The data processor 130 may be configured to process the sensor data in various ways including, but not limited to, one or more of the actions of summing, shaping, filtering, switching, gain scheduling, limiting, conditioning, and converting. The data processor 130 may be configured to operate as a neural network to facilitate sensor data and command signal processing.

In typical embodiments, the structure 110 may be an aircraft. When the pilot desires that the aircraft execute a particular control movement, a command signal is generated (such as by stick movement) and transmitted to the data processor 130. The command may alternatively be provided by an automated flight system such as an autopilot. The data processor 130 may also receive signals from structural sensors and flow sensors positioned in and on the aircraft wing and elsewhere on the aircraft. These sensors provide signals indicative of the aerodynamic flow and resulting motion of aircraft structures, particularly, the aircraft wing. A number of parameters may be sensed in this regard. These may include wing FBP locations (chord-wise and span-wise), aircraft attitude, fuselage/wing motion (accelerometer readings), aircraft altitude and Mach number. With gain scheduling for the particular aircraft included in a memory available to the data processor 130, the command signal and sensor signals, after suitable shaping, filtering, switching, conditioning, converting, command limiting, and combining are processed to determine optimal control signals for one or more aircraft actuators. As discussed above, these actuators may produce changes in control surface configuration, surface deflections, structural variations, and surface flow actuation appropriate to produce a desired aeroelastic wing flexure and flow state.

Once determined, the control signals are transmitted from the data processor 130 to control surface actuators, structural actuators and/or surface flow actuators. Flow and structural actuation produces aerodynamic loads on the wings that cause the wings to deflect so that each of the wings has an overall contour that will produce the desired control movement and flow condition. The control surface deflections and signals to the surface flow actuators may be tailored to produce an optimum wing shape and flow condition for the wing and for minimum drag for the given flight condition. It is the overall deflected contour of the wings and flow condition that produces the desired control movement.

The control system 100 can also be used to provide active longitudinal stability augmentation to the aircraft, which is particularly advantageous when there is no horizontal tail. The FBP sensors at several span stations provide direct information regarding the local sectional angle-of-attack, and its derivatives, through the measurement of the stagnation point. This is accomplished in the same manner as described above with the exception that the data processor 130 computes its control signals to maintain stability based only upon the signals from the sensors, especially the FBP sensors. When stability and flight control are required simultaneously, data processor 130 may process all input signals to arrive at control signals that most efficiently accomplish both functions. Thus, the data processor 130 can transmit control signals to the control surfaces and structural and surface flow actuators to produce (with minimum drag), under the current flight conditions, a wing contour and flow condition that provide aircraft longitudinal stability and/or a desired flight control movement.

As an alternate to gain scheduling in the data processor 130 or in addition to such gain scheduling, a self-adaptive approach can be used. This approach employs incremental actuation of selected control surfaces, structural actuators and surface flow actuators with the resulting aircraft flow and movement monitored and fed back to the data processor 130. Based upon the feedback signals, the data processor 130 will continually recalculate the optimal actuation state for the various actuators to cause the wing deflection and flow condition that will result in the desired aircraft control. The FBP sensors will advantageously provide quick feedback on the differential aerodynamic loads. This control scheme may be combined with gain scheduling which would be used for initial actuation state of the actuators.

The self-adaptive concept also allows the system to compensate for a damaged or inoperative actuator. Since such an actuator would not bring about the expected control effect, the data processor 130 would search for a combination of actuators that would.

With the ability to compensate for a damaged or inoperative control surface, the present invention results in another advantage, namely that less control redundancy is required. This would allow additional reductions in weight, complexity and costs. Moreover, the present invention enables the monitoring and control of surface flow actuators as a lightweight, low-power replacement or as a secondary mechanism to conventional control surfaces, thus, reducing the control surface deflections required. Due to the smaller control surface deflections required, the surface hinge movements may be reduced, allowing the use of smaller, lighter, and lower power actuators.

If the pilot (or automatic control system) generates a roll command that is intended to cause a certain roll rate, the data processor 130 may be programmed to transmit control signals to the various actuators to cause the aeroelastic contour of the wings, in combination with the flow state, to adjust to produce the desired movement. In conventional high-speed cases, aileron reversal would reduce the control effectiveness. The control technique using the methods of the invention, however, will be unaffected because it takes advantage of wing flexibility rather than opposing it. The FBP sensors in combination with structural deformation sensors provide the aerodynamic and structural sensing required to determine the control path for compensating for uncommanded deformations. The control surfaces are used to effectively reshape and/or twist the wing to obtain the wing contours that will effect a desired control command instead of directly providing the forces needed to effect the command, which would require them to overcome opposing aeroelastic wing twist. This allows for a lighter weight wing (since less stiffness is required) and the elimination of a rolling tail, which also saves weight and reduces aircraft observables.

Pitch control for aircraft can be accomplished by positioning the wing control surfaces to cause deflections of the wings and/or by actuating the surface flow actuators to bring about the desired pitch. Wing deflections to cause the desired pitch movement are optimally based upon the minimum drag configuration. Using the FBP sensor allows the data processor 130 to determine the actuator signal(s) required to obtain the optimal angle-of-attack, or stagnation point, for a minimum drag configuration.

A significant advantage of the present invention is the ability to configure the aircraft wings for substantially optimum performance under varying flight conditions. Optimal wing contour for transonic maneuver, supersonic cruise, landing and takeoff, and high-speed acceleration vary substantially. The present invention is able to address this problem by significantly varying the shape of wings and local flow conditions as desired based upon pilot or data processor 130 control and FBP and other sensor signals. Essentially, the wings can be aeroelastically tailored resulting in more freedom with the current invention to vary wing configuration as desired for the particular flight condition.

In an aircraft application, the control system 100 may incorporate the ability to compensate for maneuver load control, gust load alleviation, and flutter suppression. In such an embodiment, the system 100 allows for further reductions in wing weight and stiffness. The data processor 130 receives pilot command signals (when transmitted by the pilot or an automatic pilot) and signals from the FBP sensors for the aerodynamic load measurement, vertical fuselage sensors, and wing sensors.

When no maneuver load control, gust load alleviation, or flutter suppression is required, the data processor 130 may be configured, in response to FBP and structural sensors and pilot command signals, to compute optimal flap movements to cause the wing flexure that will maintain stability, produce desired control movements, and bring about optimum wing configuration for the particular flight conditions (e.g., subsonic/supersonic cruise). Control signals from the data processor 130 are subsequently transmitted to the control surfaces, flow and structural actuators. The controlled movement of the flaps produces aerodynamic loads on the wings that cause the wings to deflect so that each of the wings has an overall contour that will produce the desired control movement (or stability augmentation) and optimum wing configuration for the flight conditions. Moreover, the structural actuators may selectively strengthen wing structures to prevent adverse structural coupling. Gain scheduling by data processor 130 may be based upon providing optimum wing shape for minimum drag for the given flight conditions (and to effect any stability augmentation and desired control movements).

When maneuver load control, gust load alleviation, or flutter suppression is necessary as determined by the data processor 130 based upon the signals from sensors (such as where the wing has been deflected due to flutter, gusts, and or maneuver loads), the data processor 130 can be configured to processes such signals in combination with the signals from the FBP and structural sensors and any pilot command signal to compute movements for the flaps. Thus, computed flap movements to effect stability augmentation and/or a desired control movement would be combined with computed flap movements necessary to compensate for maneuver load control, gust alleviation, or flutter suppression. If no control movement or stability augmentation is required at a given time when flutter suppression, maneuver load control, or gust alleviation is required, then the control surfaces, flow and structural actuators will be actuated by data processor 130 solely to offset the detected maneuver loads, gusts, or flutter.

As noted above, a self-adaptive method may be used in combination with gain scheduling for the data processor 130. For desired control movements or optimum configuration for a given flight condition, the data processor 130 would use feedback of resulting aircraft movement. For gusts, flutter, and maneuver loads, the data processor 130 would use feedback from the wing sensors to determine the impact of the flap movements.

A control system according to the invention may incorporate a multi-loop controller. In a simple case, the location of an FBP such as the attachment line can be controlled by one of the loops. The controller can then be sent commands to change the wing deformations (e.g. control surface deflections) to move the FBP, at a certain speed and acceleration, to a new location. As FBP locations can be related to aerodynamic loads and moments, sending commands to this controller effectively commands an aerodynamic load and moment state for the aircraft wing.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A system for control of a structure immersed in a fluid flow regime, the system comprising:
   a plurality of flow sensors disposed on a surface of the structure, the plurality of flow sensors including at least one flow bifurcation point sensor;
   at least one structural sensor attached to the structure for measurement of a structural parameter;
   a data processor in communication with the flow sensors and the at least one structural sensor for receiving data signals therefrom, the data processor being configured for processing the data signals and for generating and transmitting one or more actuator command signals to effect a desired flow and structural state for the structure; and
   at least one actuator in communication with the data processor, each of the at least one actuator being configured for effecting, in response to receiving an actuator command signal from the data processor, one of the set consisting of a structural deformation in at least a portion of the structure, a change in configuration of a control surface of the structure, and an operational change in a flow control device embedded in the structure.

2. A system according to claim 1 wherein the data processor is further configured for receiving an active control command and for using the control command in combination with the data signals to generate the one or more actuator command signals.

3. A system according to claim 1 wherein the data processor is further configured for processing the data signals using at least one of the set consisting of summing, shaping, filtering, switching, gain scheduling, limiting, conditioning, and converting.

4. A system according to claim 1 wherein the flow bifurcation point sensor is a hot-film sensor.

5. A system according to claim 1 wherein the flow bifurcation point sensor is a shear stress sensor.

6. A system according to claim 1 wherein the flow bifurcation point sensor is a heat flux sensor.

7. A system according to claim 1 wherein the at least one structural sensor includes at least one of the set consisting of an accelerometer and a strain gage.

8. A system according to claim 1 wherein the data processor is configured to determine the actuator command signal based on a real-time estimate of the energy transfer from the fluid to the structure as determined from the data signals.

9. A system according to claim 1 wherein the structure comprises at least a portion of an aircraft.

10. A system according to claim 9 wherein the at least one flow bifurcation point sensor is disposed on a wing surface.

11. A method for controlling the flow and structural state of a structure immersed in a fluid flow regime, the method comprising:
    receiving flow data from a plurality of flow sensors disposed on a surface of the structure, the plurality of flow sensors including at least one flow bifurcation point sensor;
    receiving structural data from at least one structural sensor attached to the structure for measurement of a structural parameter;
    processing the flow and structural data to determine one or more actuator command signals;
    transmitting the one or more actuator command signals to at least one actuator configured for effecting in response one of the set consisting of a structural deformation in at least a portion of the structure, a change in configuration of a control surface of the structure, and an operational change in a flow control device embedded in the structure.

12. A method according to claim 11 further comprising the action of receiving an active control command and wherein the active control command is used with the flow and structural data to determine the one or more actuator command signals.

13. A method according to claim 11 wherein the actions of receiving flow data, receiving structural data, processing the flow and structural data and transmitting the one or more actuator commands are carried out by a data processor in communication with the flow sensors, the at least one structural sensor, and the at least one actuator.

14. A method according to claim 11 wherein the action of processing the flow and structural data includes at least one of the set consisting of summing, shaping, filtering, switching, gain scheduling, limiting, conditioning, and converting at least a portion of the flow and structural data.

15. A method according to claim 11 wherein the flow bifurcation point sensor is a hot-film sensor.

16. A method according to claim 11 wherein the flow bifurcation point sensor is a shear stress sensor.

17. A method according to claim 11 wherein the at least one structural sensor includes at least one of the set consisting of an accelerometer and a strain gage.

18. A method according to claim 11 wherein the action of processing the flow and structural data to determine one or more actuator command signals includes determining the actuator command signal based on a real-time estimate of the energy transfer from the fluid to the structure as determined from the flow and structural data.

19. A method according to claim 11 wherein the structure comprises at least a portion of an aircraft.

20. A method according to claim 19 wherein at least one flow bifurcation point sensor is disposed on a wing surface.

* * * * *